(12) United States Patent
Viswanathan et al.

(10) Patent No.: US 11,874,956 B2
(45) Date of Patent: *Jan. 16, 2024

(54) DISPLAYING AUGMENTED REALITY RESPONSIVE TO AN INPUT

(71) Applicant: Micron Technology, Inc., Boise, ID (US)

(72) Inventors: Radhika Viswanathan, Boise, ID (US); Bhumika Chhabra, Boise, ID (US); Carla L. Christensen, Boise, ID (US); Zahra Hosseinimakarem, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,085

(22) Filed: Jan. 10, 2023

(65) Prior Publication Data

US 2023/0161402 A1     May 25, 2023

Related U.S. Application Data

(63) Continuation of application No. 17/083,835, filed on Oct. 29, 2020, now Pat. No. 11,561,611.

(51) Int. Cl.
    *G06F 3/01*      (2006.01)
    *G06T 19/00*      (2011.01)
    *G06F 9/38*      (2018.01)

(52) U.S. Cl.
    CPC ............ *G06F 3/011* (2013.01); *G06F 9/3836* (2013.01); *G06T 19/006* (2013.01)

(58) Field of Classification Search
    CPC ...... G06F 3/011; G06F 9/3836; G06T 19/006; G06Q 30/0255
See application file for complete search history.

(56) References Cited

U.S. PATENT DOCUMENTS 10,078,917 B1    9/2018    Gaeta et al.
2012/0019547 A1    1/2012    Tjen et al.
(Continued)

FOREIGN PATENT DOCUMENTS

| KR | 20090040839 A | 4/2009 |
|----|---------------|--------|
| KR | 20090087807 A | 8/2009 |
| WO | 2011152634 A2 | 12/2011 |

OTHER PUBLICATIONS

Aurelia, "Mobile Augmented Reality and Location Based Service", Advances in Information Science and Applications, 2014, pp. 551-558, vol. II.

*Primary Examiner* — Chante E Harrison
(74) *Attorney, Agent, or Firm* — Brooks, Cameron & Huebsch, PLLC

(57) ABSTRACT

Methods, devices, and systems related to a computing device for displaying an AR responsive to an input are described. An input can include, but is not limited to, a timestamp, weather data, event data, a rating, a user preference, a user input, or a location. In an example, a method can include receiving an input at an AR platform of a computing device from a processing resource of the computing device, receiving an image at the AR platform from a camera of the computing device, comparing the image to a number of AR images included on the AR platform, determining at the AR platform that the image is an AR image of the number of AR images, receiving at a user interface an AR associated with the AR image from the AR platform, and displaying the AR on the user interface in response to receiving the AR.

20 Claims, 4 Drawing Sheets

(56) References Cited

U.S. PATENT DOCUMENTS

| | | |
|---|---|---|
| 2013/0194164 A1 | 8/2013 | Sugden et al. |
| 2013/0293586 A1 | 11/2013 | Kaino et al. |
| 2014/0267403 A1 | 9/2014 | Maciocci et al. |
| 2015/0123966 A1 | 5/2015 | Newman |
| 2018/0255285 A1 | 9/2018 | Hall et al. |
| 2019/0385375 A1 | 12/2019 | Park |
| 2020/0273251 A1 | 8/2020 | Palos et al. |
| 2020/0311424 A1 | 10/2020 | Mancuso et al. |
| 2020/0342231 A1 | 10/2020 | Richter et al. |
| 2021/0012572 A1 | 1/2021 | Ishigaki et al. |
| 2021/0056762 A1 | 2/2021 | Robbe et al. |
| 2021/0084233 A1 | 3/2021 | Faaborg et al. |
| 2021/0117417 A1 | 4/2021 | Hendrickson et al. |
| 2021/0303860 A1 | 9/2021 | Anvaripour et al. |
| 2022/0138994 A1* | 5/2022 | Viswanathan ........ H04L 67/131 345/633 |

\* cited by examiner

DISPLAYING AUGMENTED REALITY RESPONSIVE TO AN INPUT

PRIORITY INFORMATION

This application is a Continuation of U.S. application Ser. No. 17/083,835 filed on Oct. 29, 2020, the contents of which are incorporated herein by reference.

TECHNICAL FIELD

The present disclosure relates generally to a computing device, and more particularly, to methods, apparatuses, and systems related to augmented reality (AR).

BACKGROUND

A computing device can be, for example, a personal laptop computer, a desktop computer, a smart phone, a tablet, a wrist-worn device, a digital camera, and/or redundant combinations thereof, among other types of computing devices. In some examples, a computing device can display an augmented reality (AR) and/or perform artificial intelligence (AI) operations.

AR can overlay virtual objects on a real-world (e.g., natural) environment. For example, AR can add a 3D hologram to reality. In some examples, AR can be an interactive experience of a real-world environment where real-world objects are enhanced by computer-generated perceptual information. The AR can mask a portion of the real-world environment and/or add to the real-world environment such that it is perceived as an immersive aspect of the real-world environment. Accordingly, AR can alter a person's perception of a real-world environment. A head-up display, a headset, a smart glass, smart contacts, a light field display, a laser, and/or several sources of light can be used to create AR.

In some examples, a computing device can include an AI accelerator. An AI accelerator can include components configured to enable the computing device to perform AI operations. In some examples, AI operations may include machine learning or neural network operations, which may include training operations or inference operations, or both.

DETAILED DESCRIPTION

Figure 1:
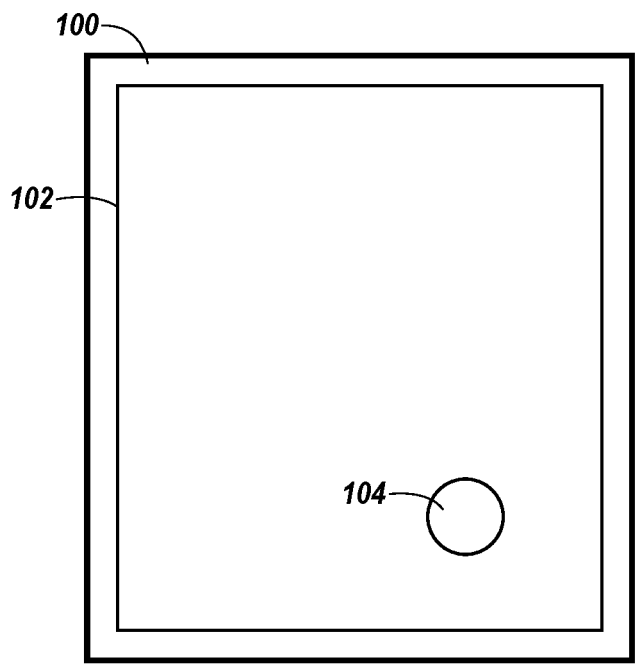
FIG. 1 illustrates an example of a user interface of a computing device for displaying an AR in accordance with a number of embodiments of the present disclosure.

The present disclosure includes methods, apparatuses, and systems related to displaying an AR responsive to an input. An example method can include receiving an input at an AR platform of a computing device from a processing resource of the computing device, receiving an image at the AR platform from a camera of the computing device, comparing the image to a number of AR images included on the AR platform, determining at the AR platform that the image is an AR image of the number of AR images, receiving at a user interface an AR associated with the AR image from the AR platform, and displaying the AR on the user interface in response to receiving the AR.

An input can include, but is not limited to, a timestamp, weather data, event data, a rating, a user preference, a user input, or a location. The location can be, for example, a location of the computing device. The location of the computing device can be determined using an accelerometer, a gyroscope, a global positioning system (GPS), a wi-fi network being used by the computing device, or a post on social media.

An AR can be received and/or displayed responsive to the location of the computing device. For example, an AR can be received at a user interface and/or displayed on the user interface of a computing device when the location of the computing device is within a particular distance of the AR image, when the location of the computing device is within a particular area of an event, when the location of the computing device is a particular distance away from a different location and/or, when the computing device is within a particular distance of a different location.

In a number of embodiments, a user can be notified that AR is available prior to displaying the AR. For example, a notification can be displayed on the user interface to notify the user that AR is available. A notification can be displayed responsive to receiving an input and/or determining the image generated by the camera is an AR image of the number of AR images on the AR platform.

A user can choose to ignore or view the AR. The notification can be removed from the user interface and the AR can be displayed on the user interface responsive to receiving a selection on the user interface. In some examples, the notification can be removed from the user interface responsive to receiving a different selection on the user interface or a user ignoring the notification. For example, the notification can be removed from the user interface after a particular period of time has passed without the user interface receiving a selection.

The notification can include AR data. The AR data can be from the AR platform on the computing device. The AR platform can include a number of AR images and AR data associated with each of the number of AR images. The AR data can include the creator, genre, content, and/or ratings of the AR, for example. In some examples, the AR data can include data for displaying an AR. The AR data or a portion of the AR data can be stored on the AR platform and/or in memory on and/or external to the computing device.

A user's response to the notification can be stored as user data. The user data can be stored in memory on and/or external to the computing device. The AR data and/or the user data can be used to perform AI operations on an AI model. AI operations can, for example, set (e.g., create) user preferences. The user preferences can be set based on a user's previous responses to notifications and/or a user's previous responses to AR. In some examples, the computing device may not notify a user if an AR is available responsive to AR data including one or more characteristics in common with characteristics of an AR a user has ignored before. For example, the computing device may not notify a user if an AR is available responsive to the AR being of a particular genre that the user has previously ignored.

As used herein, "a number of" something can refer to one or more of such things. For example, a number of computing devices can refer to one or more computing devices. A "plurality" of something intends two or more.

The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "2" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a user interface 102 of a computing device 100 for displaying an AR in accordance with a number of embodiments of the present disclosure. The user interface 102, as illustrated in FIG. 1, can further include an AR image 104. An AR image 104 can be an image that triggers an AR.

In a number of embodiments, a camera (e.g., camera 428 in FIG. 4, camera 528 in FIG. 5) can detect an AR image 104 by comparing an image generated by the camera to a number of AR images and determining the image generated by the camera is an AR image of the number of AR images. In some examples, computing device 100 can include one or more cameras. One of the one or more cameras can be used solely for detecting AR images. In a number of embodiments, one or more optical sensors can be used with one or more cameras to detect an AR image 104 or, in contrast, one or more optical sensors can be used instead of one or more cameras to detect an AR image 104.

AR can overlay virtual objects on a real-world environment to mask a portion of the real-world environment and/or add to the real-world environment such that it is perceived as an immersive aspect of the real-world environment. In some examples, AR can display and/or automate a number of images and/or enhance the AR image 104 to move and/or change on the user interface 102, as shown in FIG. 2.

The user interface 102 can be generated by the computing device 100. The user interface 102 can be a graphical user interface (GUI) that can provide and/or receive information to and/or from the user of the computing device 100. The user interface 102 can be shown on a display of the computing device 100. In some examples, the display can be a touchscreen.

Figure 2:
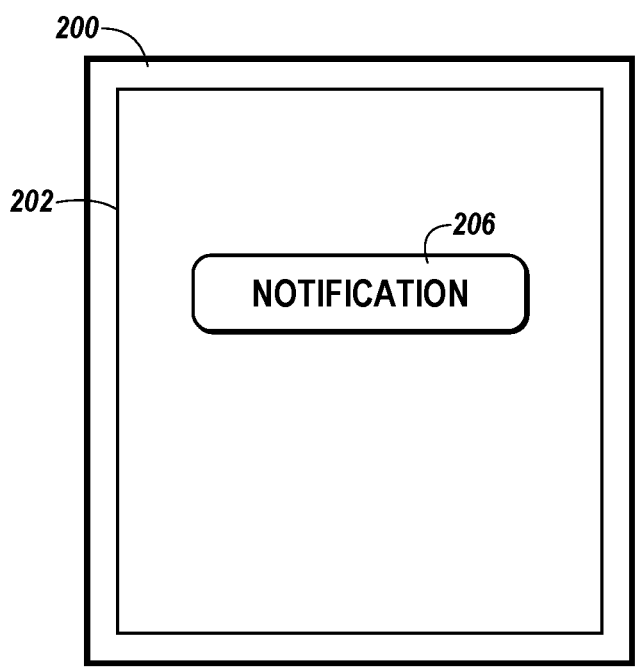
FIG. 2 illustrates an example of a user interface of a computing device for displaying an AR in accordance with a number of embodiments of the present disclosure.

FIG. 2 illustrates an example of a user interface 202 of a computing device 200 for displaying an AR in accordance with a number of embodiments of the present disclosure. In a number of embodiments, the user interface 202 can be generated in response to determining an image generated by a camera is an AR image (e.g., AR image 104 in FIG. 1). The user interface 202, as illustrated in FIG. 2, can include a notification 206.

The user interface 202 can notify a user that an AR is available by displaying the notification 206. However, embodiments are not limited to displaying a notification 206 on a user interface 202. A computing device 200 can notify a user that an AR is available by producing audio and/or vibration, for example. The notification 206 can be displayed, audio can be produced, and/or vibration can be produced by the computing device 200 responsive to receiving an input and/or determining an image generated by a camera is an AR image.

In some examples, the user interface 202 can display the AR responsive to receiving a command and/or a selection of the notification 206 on the user interface 202. A command and/or a selection can be a user pressing, tapping, and/or clicking on the notification 206 displayed on the user interface 202. In a number of embodiments, the user interface 202 can display the AR responsive to the computing device receiving a passcode and/or password, the computing device 200 performing facial recognition on the user, and/or the computing device 200 performing fingerprint identification on the user.

A user can choose to ignore or view the AR content. The notification 206 can be removed from the user interface 202 and the AR can be displayed on the user interface 202 responsive to receiving a command and/or a selection to view the AR on the user interface 202. In some examples, the notification 206 can be removed from the user interface 202 responsive to the user interface 202 receiving a command and/or a selection from the user to ignore (e.g., not view) the AR or a user ignoring the notification 206. For example, the notification 206 can be removed from the user interface 202 after a particular period of time has passed without the user interface 202 receiving a command and/or a selection.

The notification 206 can include AR data. In some examples, the AR data can be displayed on the user interface 202 responsive to the user interface 202 receiving a selection from the user to view the AR data. The AR data can be metadata received from the AR image. The AR data can include the creator, genre, content, and/or ratings, for example. The notification 206, AR data, and/or a portion of the AR data can be stored in memory on and/or external to the computing device 200.

A user's response to the notification 206 can be stored as user data. The user data can be stored in memory on and/or external to the computing device 200. The AR data and/or the user data can be used to perform AI operations. AI operations can, for example, set (e.g., create) user preferences. The user preferences can be set based on a user's previous responses to notifications and/or a user's previous responses to AR. In some examples, the computing device 200 may not notify a user if an AR is available responsive to AR data including one or more characteristics in common with characteristics of an AR a user has previously ignored. For example, the computing device 200 may not notify a user if an AR is available responsive to the AR having a particular rating that the user has ignored before.

Figure 3:
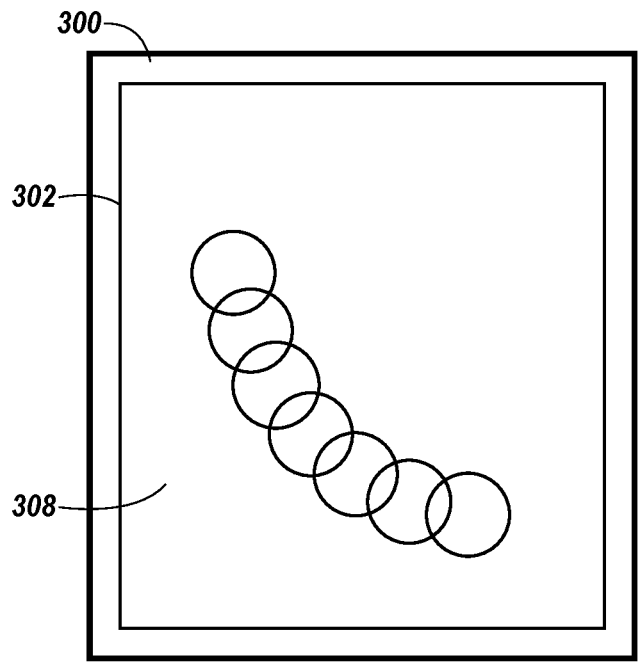
FIG. 3 illustrates an example of a user interface of a computing device for displaying an AR in accordance with a number of embodiments of the present disclosure.

FIG. 3 illustrates an example of a user interface 302 of a computing device 300 for displaying an AR 308 in accordance with a number of embodiments of the present disclosure. In some examples, the user interface 302 can be generated in response to receiving an input at the computing device 300 and determining an image generated by a camera is an AR image (e.g., AR image 104 in FIG. 1).

The input can be generated by the computing device 300 or generated by a different computing device and received at the computing device 300. The input can be, but is not limited to a location, a timestamp, weather data, event data, ratings, user preferences, and/or a user input.

The location can be, for example, a location of the computing device 300. The location of the computing device 300 can be determined using an accelerometer, a gyroscope, a global positioning system (GPS), a wi-fi network, or a social media application. An AR 308 can be received at the user interface 302 and/or displayed on the user interface 302 responsive to a location of the computing device 300. For example, an AR 308 can be received and/or displayed when the location of the computing device 300 is within a particular distance of the AR image, when the location of the computing device 300 is within a particular area of an event, when the location of the computing device 300 is a particular distance away from a different location, and/or when the location of the computing device 300 is within a particular distance of a different location. The data representing the location of the computing device 300 can be compared to the data representing the different location, for example.

A timestamp can identify a date and/or time of day. The timestamp can be generated by a clock on the computing device 300. In some examples, a timestamp can be received at the computing device 300 from a different device. An AR 308 can be displayed responsive to a timestamp. For example, an AR 308 can be displayed when the timestamp is at a particular time and/or within a particular time range.

Weather data can include temperature data, cloud cover data, precipitation data, and/or storm data, for example. The weather data can be generated using sensors on the computing device 300 and/or external to the computing device 300. In some examples, the weather data can be received at the computing device 300 from a different device. An AR 308 can be displayed responsive to weather data. For example, an AR 308 can be displayed when a temperature at the computing device's 300 current location is within a particular temperature range, when cloud coverage at the computing device's 300 current location is within a particular cloud coverage range, when precipitation at the computing device's 300 current location is within a particular precipitation range, and/or when there is a storm at the computing device's 300 current location.

Event data can be, for example, sporting events, conventions, tours, landmarks, and/or other attractions. Event data can be stored in memory on the computing device 300 and/or external to the computing device 300. Event data can be derived from a user's calendar, email, and/or social media, for example. In some examples, event data can be received at the computing device 300 from a different device. An AR 308 can be displayed when the computing device 300 is within a particular area where the event is occurring and/or an AR 308 can be displayed during a time period the event is scheduled for.

Ratings can include review data, popularity data, and/or age data (e.g., appropriate ages for viewing content). The ratings can be generated by a user, other viewers, and/or organizations. The ratings can be received at the computing device 300. The computing device 300 can compare the ratings with the user's data and/or preferences. For example, an AR 308 can be displayed responsive to the age data of the AR being appropriate for the user's age.

User preferences can include notifying a user that an AR 308 is available if the AR image is from a particular creator, of a particular genre, includes particular content, and/or has a particular rating. User preferences can be manually inputted by a user and/or learned over time using AI. AI operations using an AI model can be performed to determine whether to notify a user of the availability of an AR 308 and/or whether to display an AR 308. User data including one or more user preferences and/or AR data can be used as weights in the AI operation. In some examples, the user data can include one or more of a user's previous responses to AR 308.

In a number of embodiments, the user can set a particular AR creator as a trusted creator. An AR creator, as used herein, can be a person, organization, and/or company that creates, distributes and/or owns the AR 308. Setting the particular AR creator as a trusted creator can allow the computing device 300 to notify the user when an AR 308 from that AR creator is available. In some examples, the computing device 300 performing AI operations using user data and/or AR data can set a particular creator as a trusted AR creator. The computing device can determine an AR image is from a trusted creator by comparing a creator of the AR image with a number of trusted creators. If the creator of the AR image matches one of the number of trusted creators the AR image is from a trusted creator.

Figure 4:
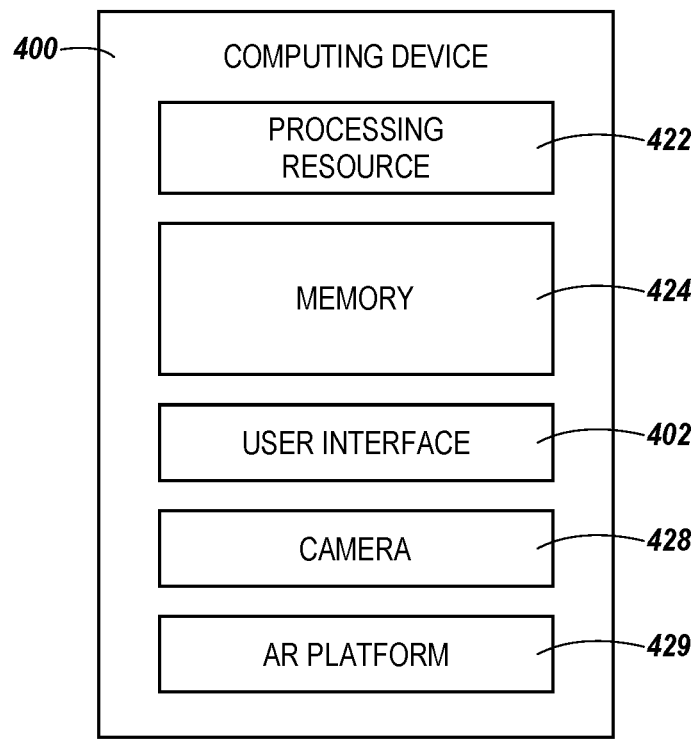
FIG. 4 illustrates an example of a computing device used for displaying an AR in accordance with a number of embodiments of the present disclosure.

FIG. 4 illustrates an example of a computing device (e.g., apparatus) 400 used for displaying an AR in accordance with a number of embodiments of the present disclosure. The computing device 400 can be an apparatus. As illustrated in FIG. 4, computing device 400 can include a processing resource (e.g., processor) 422, a memory 424, a user interface 402, a camera 428, and an AR platform 429. The computing device 400 can be, for example, a personal laptop computer, a desktop computer, a smart phone, a tablet, a wrist-worn device, a digital camera, and/or redundant combinations thereof, among other types of computing devices.

The memory 424 can be any type of storage medium that can be accessed by the processing resource 422 to perform various examples of the present disclosure. For example, the memory 424 can be a non-transitory computer readable medium having computer readable instructions (e.g., computer program instructions) stored thereon that are executable by the processing resource 422 to receive first signaling including data representing at least one of: a timestamp, weather, an event, a rating, a user preference, a user input, or a location of a computing device at an AR platform 429 of the computing device 400 from the processing resource 422, receive second signaling including data representing an image at the AR platform 429 from a camera 428 of the computing device 400, compare the data representing the image to data representing a number of AR images included on the AR platform 429, determining at the AR platform 429 that the image is an AR image of the number of AR images in response to a particular portion of the data representing the image matching data representing the AR image, receive at a user interface 402 of the computing device 400 third signaling including data representing an AR associated with the AR image from the AR platform 429 in response to receiving the first signaling and determining the image is the AR image, and display the data representing the AR associated with the AR image on the user interface 402 of the computing device 400 in response to receiving the third signaling. As used herein, signaling can include a communication (e.g., a radio signal) that carries data from one location to another. In some embodiments, the computing device 400 can include communication devices, such as, but not limited to, radios.

The memory 424 can be volatile or nonvolatile memory. The memory 424 can also be removable (e.g., portable) memory, or non-removable (e.g., internal) memory. For example, the memory 424 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 424 is illustrated as being located within computing device 400, embodiments of the present disclosure are not so limited. For example, memory 424 can be located on an external computing resource (e.g., enabling computer readable instructions to be downloaded over the Internet or another wired or wireless connection).

The AR platform 429 can be included in an operating system (OS) of the computing device 400 and/or included in an application downloaded onto the computing device 400. A number of AR images and AR data associated with each of the number of AR images can be included on the AR platform 429. The AR platform 429 can be updated with new data periodically or in response to a user command. New AR images with their associated AR data can be added to the AR platform 429 and/or existing AR images with their associated AR data can be updated on the AR platform 429. For example, AR data associated with an existing AR image can be updated to display a new AR.

As illustrated in FIG. 4, computing device 400 includes a user interface 402. A user (e.g., operator) of computing device 400, can interact with computing device 400 via user interface 402 shown on a display. For example, the user interface 402 via a display can provide (e.g., display and/or present) information to the user of computing device 400, and/or receive information from (e.g., input by) the user of computing device 400. For instance, in some embodiments, the user interface 402 can be a GUI that can provide and/or receive information to and/or from the user of computing device 400. The display showing the user interface 402 can be, for instance, a touchscreen (e.g., the GUI can include touchscreen capabilities).

The computing device 400 can include one or more cameras 428. The one or more cameras 428 can be used to detect an AR image. In some examples, one of the one or more cameras 428 can be used solely for detecting an AR image. In a number of embodiments, one or more optical sensors, not illustrated in FIG. 4, can be used with the one or more cameras or instead of the one or more cameras to detect an AR image.

In some examples, the computing device 400 can be a mobile device of a user. The user can be walking with their mobile device through an art gallery looking at various pieces of art. Each piece of art can include a corresponding AR image on and/or near it. A camera on the mobile device can detect one or more of the AR images in the art gallery. However, the mobile device will only display an AR responsive to the mobile device being within a particular distance, for example four feet, from the AR image. This prevents the mobile device from displaying an AR for a piece of artwork that the user is not near and/or looking at. The AR can display the artist talking about their artwork and/or the artist creating the artwork, for example.

Figure 5:
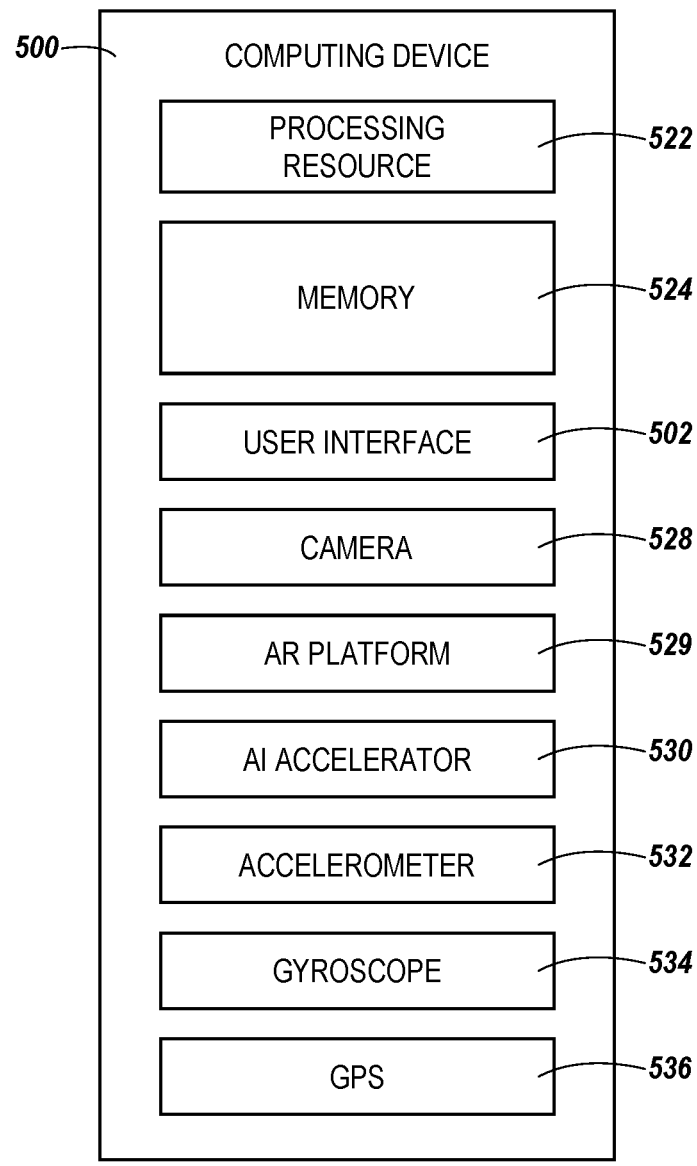
FIG. 5 illustrates an example of a computing device used for displaying an AR in accordance with a number of embodiments of the present disclosure.

FIG. 5 illustrates an example of a computing device 500 used for displaying an AR in accordance with a number of embodiments of the present disclosure. Computing device 500 can correspond to computing device 400 in FIG. 4. Computing device 500 can include a processing resource 522, a memory 524, a user interface 502, a camera 528, and an AR platform 529. The processing resource 522, the memory 524, the user interface 502, the camera 528, and the AR platform 529 can correspond to the processing resource 422, the memory 424, the user interface 402, the camera 428, and the AR platform 429, respectively in FIG. 4. As illustrated in FIG. 5, computing device 500 can further include an AI accelerator 530, an accelerometer 532, a gyroscope 534, and a global positioning system (GPS) 536.

The AI accelerator 530 can include hardware and/or software/firmware, not shown, to perform AI operations. Data stored in memory 524 on the computing device 500 and/or external to the computing device 500 can be used in performing the AI operations. The data can include user data and/or AR data. User data can include a user's response to a notification that AR is available, a user's response to an AR, and/or user AR preferences. AR data can include AR data associated with an AR image received from an AR platform 529. The AR data can include the creator, genre, content, and/or ratings of the AR, for example.

In some examples, the AI accelerator 530 can perform AI operations including machine learning or neural network operations, which may include training operations or inference operations, or both. The AR data and/or the user data can be used to perform AI operations to set user preferences. The user preferences can be set based on a user's previous responses to notifications and/or user's previous responses to AR. In some examples, the computing device 500 may not notify a user if an AR is available responsive to AR data including one or more characteristics in common with characteristics of a different AR a user has ignored before. For example, the computing device 500 may not notify a user if an AR is available responsive to the AR including particular content that the user has ignored before.

The accelerometer 532, the gyroscope 534, and/or the GPS 536 can be located on the computing device 500, as illustrated in FIG. 5, or external to the computing device 500. A location of the computing device 500 can be determined via the accelerometer 532, the gyroscope 534, and/or the GPS 536. In some examples, an AR can be displayed responsive to a location of the computing device 500. For example, an AR can be displayed when the location of the computing device 500 is within a particular distance of the AR image, when the location of the computing device 500 is within a particular area of an event, when the location of the computing device 500 is a particular distance away from a different location and/or, when the location of the computing device 500 is within a particular distance of a different location.

Figure 6:
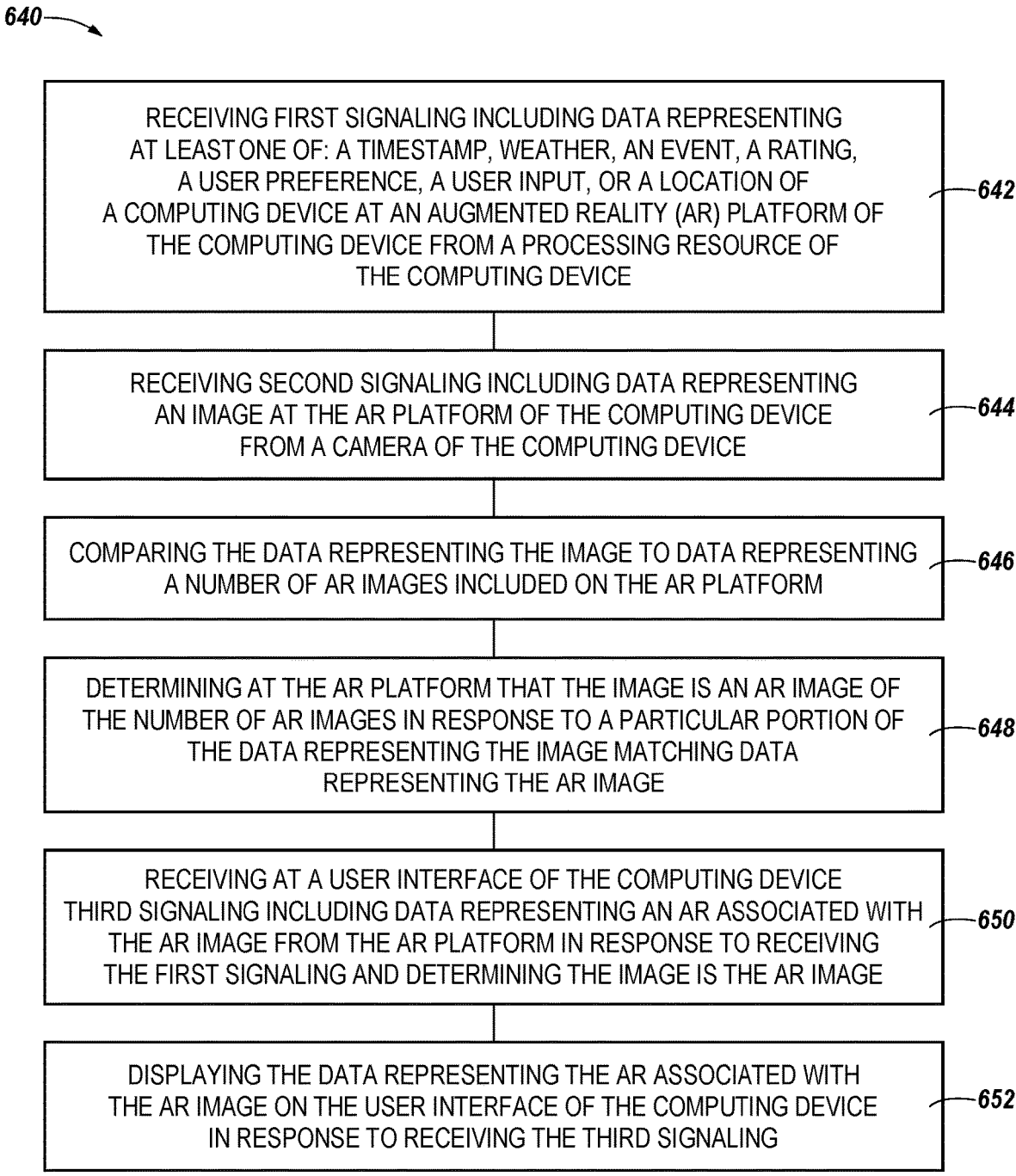
FIG. 6 is a flow diagram of a method for displaying an AR responsive to an input in accordance with a number of embodiments of the present disclosure.

FIG. 6 is a flow diagram of a method 640 for displaying an AR responsive to an input in accordance with a number of embodiments of the present disclosure. At block 642, the method 640 can include receiving first signaling including data representing at least one of: a timestamp, weather, an event, a rating, a user preference, a user input, or a location of a computing device at an AR platform of the computing device from a processing resource of the computing device. The computing device can be, for example, a personal laptop computer, a desktop computer, a smart phone, a tablet, a wrist-worn device, a digital camera, and/or redundant combinations thereof, among other types of computing devices.

At block 644, the method 640 can include receiving second signaling including data representing an image at the AR platform of the computing device from a camera of the computing device. The computing device can include one or more cameras. One of the one or more cameras can be used solely for detecting AR images. In a number of embodiments, one or more optical sensors can be used with one or more cameras to detect an AR image or, in contrast, one or more optical sensors can be used instead of one or more cameras to detect an AR image.

At block 646, the method 640 can include comparing the data representing the image to data representing a number of AR images included on the AR platform. An AR image can be an image that triggers an AR.

At block 648, the method 640 can include determining at the AR platform that the image is an AR image of the number of AR images in response to a particular portion of the data representing the image matching data representing the AR image. The AR image can be associated with data representing an AR. The data representing an AR can be used to generate and display the AR.

At block 650, the method 640 can include receiving at a user interface of the computing device third signaling including data representing an AR associated with the AR image from the AR platform in response to receiving the first signaling and determining the image is the AR image. The user interface can be generated by the computing device. The user interface can be a GUI that can provide and/or receive information to and/or from the user of the computing device. In some examples, the user interface can be shown on a display of the computing device.

At block 652, the method 640 can include displaying the data representing the AR associated with the AR image on the user interface of the computing device in response to receiving the third signaling. AR can overlay virtual objects on a real-world environment to mask a portion of the real-world environment and/or add to the real-world environment such that it is perceived as an immersive aspect of the real-world environment. In some examples, AR can display and/or automate a number of images and/or enhance an AR image to move and/or change on the user interface.

In a number of embodiments, the method 640 can further include connecting the computing device to a Wi-Fi network, receiving fourth signaling including data representing the Wi-Fi network at the processing resource, and determining the data representing the location of the computing device using the data representing the Wi-Fi network at the processing resource. The AR platform can compare the data representing the location of the computing device to data representing a location of the AR image. In some examples, the user interface can receive the third signaling including the data representing the AR associated with the AR image from the AR platform in response to the computing device being within a particular distance of the AR image.

The method 640 can further include receiving the first signaling including the data representing the timestamp, determining at the AR platform the timestamp is at a particular time or within a particular time range, and receiving at the user interface the third signaling including the data representing the AR associated with the AR image from the AR platform in response to determining the timestamp is at the particular time or within the particular time range.

In some examples, the method 640 can further include receiving the first signaling including the data representing the weather, determining at the AR platform using the data representing the weather at least one of a temperature at a current location of the computing device being within a particular temperature range, a cloud coverage at the current location of the computing device being within a particular cloud coverage range, a precipitation at the current location of the computing device being within a particular precipitation range, or there being a storm at the current location of the computing device, and receiving at the user interface of the computing device the third signaling including the data representing the AR associated with the AR image from the AR platform in response to the determination at the AR platform. The weather can be determined using a sensor on the computing device or a sensor external to the computing device.

The method 640 can further include receiving the first signaling including the data representing the event, determining at the AR platform using the data representing the event at least one of the computing device being within a particular area of where the event is occurring or a time on the computing device being within a time period the event is scheduled for, and receiving at the user interface of the computing device the third signaling including the data representing the AR associated with the AR image from the AR platform in response to the determination at the AR platform.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving first signaling including data representing a rating of an augmented reality (AR) at a computing device;
comparing the rating of the AR with a user's previous response to a notification that AR is available;
receiving at a user interface of the computing device second signaling including data representing the AR associated with the rating of the AR in response to comparing the rating of the AR with the user's previous response to the notification that AR is available; and
displaying the data representing the AR on the user interface of the computing device in response to receiving the second signaling.

2. The method of claim 1, further comprising receiving the first signaling at an AR platform of the computing device.

3. The method of claim 2, further comprising comparing the rating of the AR with the user's previous response to the notification that AR is available at the AR platform.

4. The method of claim 1, further comprising receiving third signaling including data representing an image from a camera of the computing device.

5. The method of claim 4, further comprising comparing the data representing the image to data representing a number of AR images.

6. The method of claim 5, further comprising determining the image is an AR image of the number of AR images in response to a particular portion of the data representing the image matching data representing the AR image.

7. The method of claim 6, further comprising receiving at the user interface of the computing device the second signaling including the data representing the AR associated with the rating of the AR in response to determining the image is the AR image.

8. An apparatus, comprising:
an augmented reality (AR) platform;
a user interface;
a memory; and
a processor configured to execute executable instructions stored in the memory to:
receive first signaling including data representing a rating of an AR at the AR platform from the processor;
compare the rating of the AR with a user's previous responses to AR;
receive second signaling including data representing the AR at the user interface in response to comparing the rating of the AR with the user's previous responses to AR; and
display the data representing the AR on the user interface in response to receiving the second signaling.

9. The apparatus of claim 8, further comprising a camera, wherein the camera is configured to transmit third signaling including data representing an image.

10. The apparatus of claim 9, wherein the camera is only used for detecting AR images.

11. The apparatus of claim 9, wherein the AR platform is configured to receive the third signaling including the data representing the image from the camera.

12. An apparatus, comprising:
an augmented reality (AR) platform;
a user interface;
a memory; and
a processor configured to execute executable instructions stored in the memory to:
receive first signaling including data representing a rating of an AR at the AR platform from the processor;
compare the rating of the AR with a user's previous responses to notifications that AR is available;
receive at the user interface of the apparatus second signaling including data representing a notification that AR is available from the AR platform in response to comparing the rating of the AR with the user's previous responses to notifications that AR is available; and
display the data representing the notification that AR is available at the user interface in response to receiving the second signaling.

13. The apparatus of claim 12, wherein the processor is further configured to compare the rating of the AR with a user's previous responses to AR.

14. The apparatus of claim 13, wherein the processor is further configured to receive at the user interface of the apparatus the second signaling including the data representing the notification that AR is available from the AR platform in response to comparing the rating of the AR with the user's previous responses to AR.

15. The apparatus of claim 12, wherein the processor is further configured to receive third signaling including data representing a command to display the AR on the user interface in response to receiving the command from a user of the apparatus.

16. The apparatus of claim 15, wherein the processor is further configured to display data representing the AR on the user interface in response to receiving the third signaling.

17. The apparatus of claim 15, wherein the processor is further configured to store the data representing the command to display the AR in the memory in response to receiving the third signaling.

18. The apparatus of claim 12, wherein the processor is further configured to receive third signaling including data representing a command to remove the notification that AR is available in response to receiving the command from a user of the apparatus.

19. The apparatus of claim 18, wherein the processor is further configured to remove the data representing the notification that AR is available from the user interface in response to receiving the third signaling.

20. The apparatus of claim 18, wherein the processor is further configured to store the data representing the command to remove the notification that AR is available in the memory in response to receiving the third signaling.

* * * * *